Feb. 23, 1943.  L. GUILD  2,312,092
MOLDING
Filed Oct. 29, 1938  2 Sheets-Sheet 1
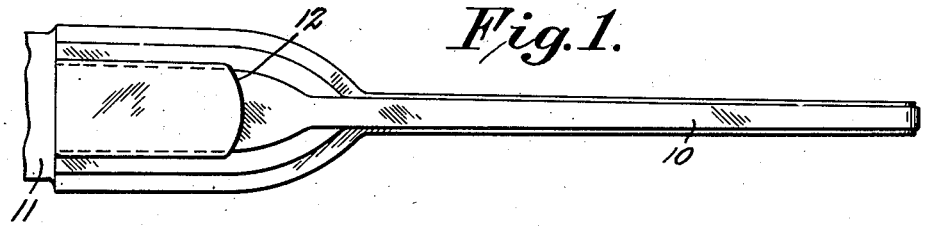
*Fig.1.*
*Fig.2.*
*Fig.3.*
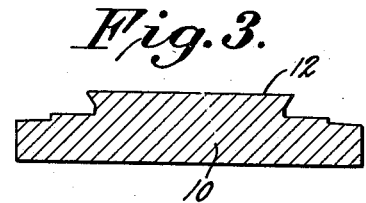
*Fig.4.*
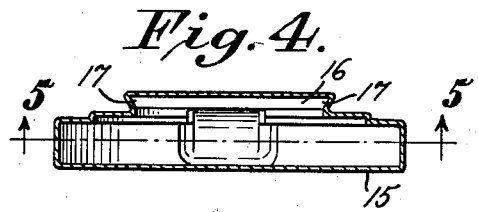
*Fig.8.*
*Fig.6.* *Fig.5.*
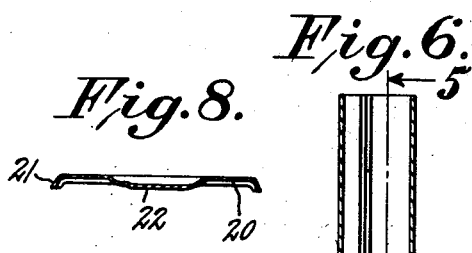
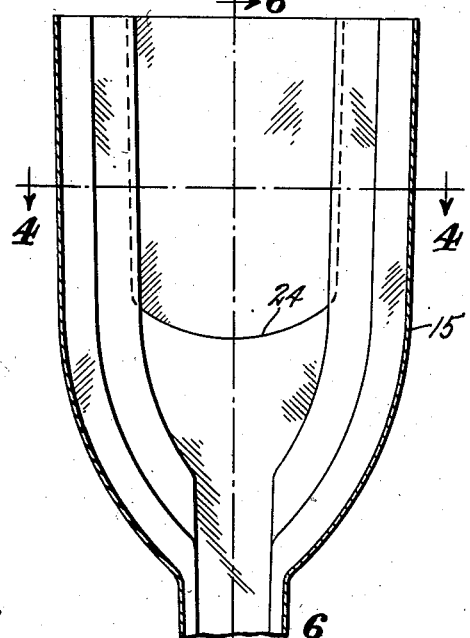
*Fig.7.*
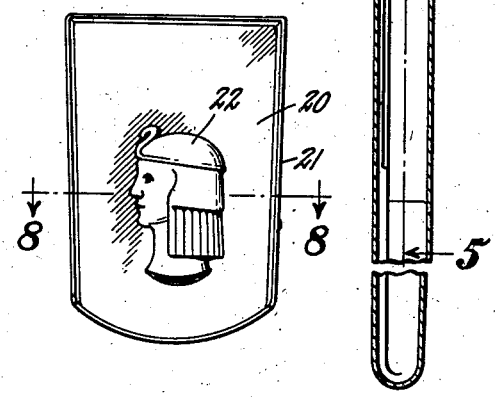
INVENTOR,
Lurelle Guild,
BY
his ATTORNEY.

Feb. 23, 1943.  L. GUILD  2,312,092
MOLDING
Filed Oct. 29, 1938  2 Sheets-Sheet 2
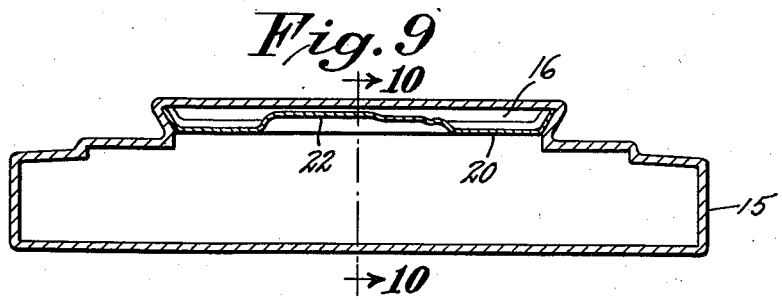
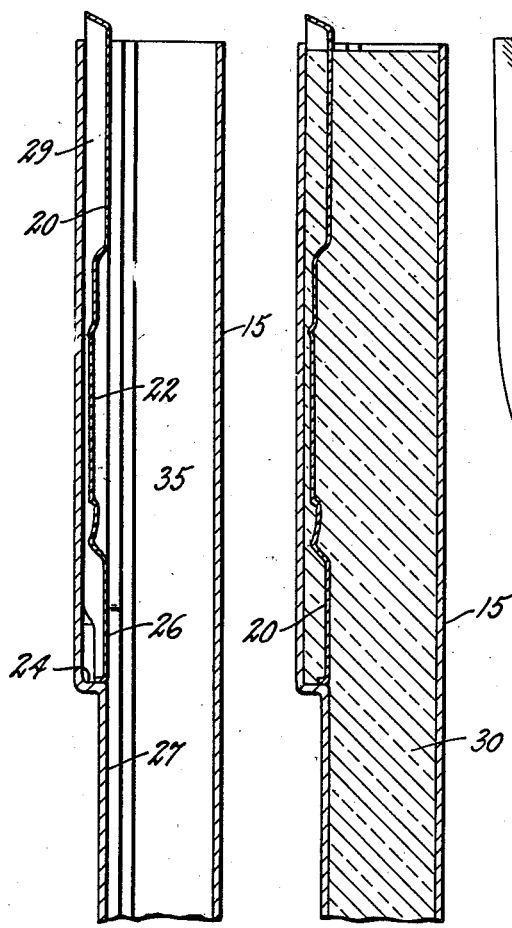
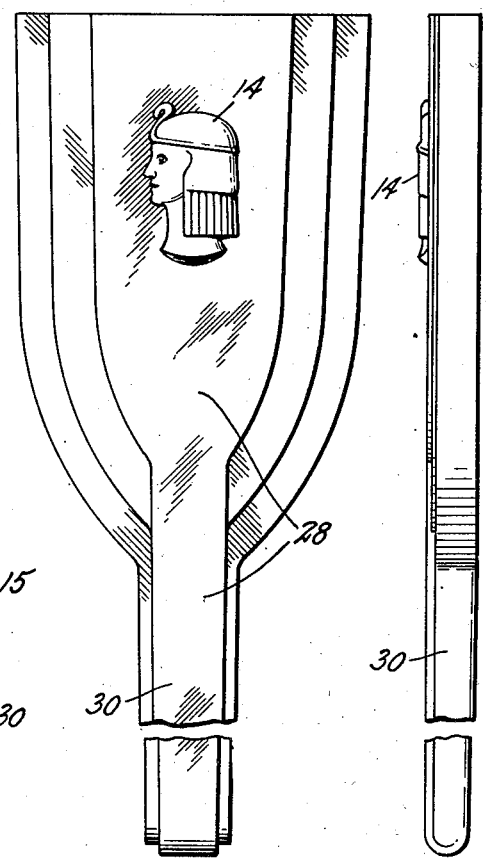
INVENTOR,
Lurelle Guild
BY
his ATTORNEY.

Patented Feb. 23, 1943

2,312,092

UNITED STATES PATENT OFFICE 2,312,092

MOLDING

Lurelle Guild, Darien, Conn.

Application October 29, 1938, Serial No. 237,624

5 Claims. (Cl. 18—39)

My invention relates to molding and articles made by molding, particularly casting by pouring, and more particularly to the art of casting phenol or resin derivatives such as Catalin.

One object of my invention is to provide a method whereby embossing can be applied to cast materials, particularly where a single-piece mold vessel is used and the cast material must remain in the mold vessel for a period of time for curing. Another object is to provide an inexpensive die organization for quantity molding. Another object is to provide new and novel cast articles. Further objects of the invention will appear as the description of the preferred form of my invention proceeds.

While I will describe one embodiment of the invention, it is to be understood that the invention is not limited to the form specifically herein explained but is capable of embodiment in a variety of expressions.

The preferred form will be understood from the following explanation considered in conjunction with the accompanying drawings forming a part of this invention, and of which:

Fig. 1 is a plan view of a master pattern;

Fig. 2 is a side view of the master pattern shown in Fig. 1;

Fig. 3 is a transverse sectional view taken on the line 3—3 of Fig. 2;

Figs. 4, 5 and 6 are respectively sectional views of a mold vessel. Fig. 4 is taken on line 4—4 of Fig. 5. Fig. 5 is taken on line 5—5 of Figs. 4 and 6. Fig. 6 is taken on line 6—6 of Fig. 5;

Fig. 7 is an elevational view of an insert;

Fig. 8 is taken on line 8—8 of Fig. 7;

Fig. 9 is a transverse sectional view of the mold vessel with the insert in place;

Fig. 10 is taken on line 10—10 of Fig. 9;

Fig. 11 is a showing similar to that of Fig. 10 with material poured into the mold vessel;

Fig. 12 is an elevational view of the finished article; and

Fig. 13 is a side view of the article shown in Fig. 12.

The process involves a single master pattern 10 having the shape shown in Figs. 1 to 3. The top of pattern 10 is provided with a suitable extension 11 for handling and providing cooling surface. Master pattern 10 is substantially of the shape of the final article shown in Figs. 12 and 13, differing in that it is built up at 12 to an extent corresponding to at least the height, width, and length of the embossed figure 14 shown in Figs. 12 and 13 and further to provide a drawable section with respect to a mold vessel to be formed thereon and still further to provide holding means for an insert, and in that it is longer. Pattern 10 is accurately made and polished. It may be made of a high grade steel. It serves for the production of a quantity of mold vessels 15 shown in Figs. 4, 5 and 6.

Mold vessels 15 are made as follows: The master pattern 10 is dipped into a bath of lead, zinc, or other suitable material in fluid state slightly above the freezing temperature of the metal of the bath. Pattern 10 being relatively cool when dipped, the lead or zinc solidifies at the surface of the pattern and a thin skin of the lower melting point metal forms clinging to the pattern. Extended surface for heat conduction may be provided in conjunction with handle 11. The pattern may be dipped once or several times depending on the thickness of skin desired. The pattern 10 with the adherent skin of mold metal is removed and on cooling the skin 15 is removed from the pattern 10 and the pattern 10 may be used for making the next mold vessel. It will be seen that the removed skin which can readily be drawn or knocked off the pattern without injury, constitutes the mold vessel 15. This mold vessel has an internal volume corresponding substantially to the ultimate cast object except as it is larger by the cavity 16 caused by the built-up section 12. Cavity 16 has dove-tails 17 for holding in place the insert 20 shown in Figs. 7 and 8.

Insert 20 is preferably a stamping made of stainless steel of a thickness on the order of ten one thousandths of an inch. It may be made from flat stock and has edge flanges 21 and is dished at 22 to form a pattern for the embossing 14. Fig. 7 shows the back side of the insert relative to the article body. The side flanges are uniformly closer downwardly of the insert for drawing on hardening and curing. As many inserts must be made as molds to be in process, since the insert stays in the mold vessel during curing.

In preparation for pouring, the desired number of mold vessels 15 is stacked in a suitable fixture with the open end up and an insert 20 is placed in each mold vessel. The combination mold vessel and insert ready for pouring is shown in Figs. 9 and 10. As is seen in Fig. 9, the side flanges of the insert engage in the dove-tails 17 and the bottom of the insert seats on the bottom 24 of the pocket 16. In the particular embodiment shown, the front face 26 of the insert is flush with the inside surface of the mold vessel at 27. This provides the continuous plane 28 in the molded article (Fig. 12) but, of course, this would depend on the ultimate shape desired. The depression 22, as is seen in Fig. 10, extends inwardly into pocket 16. A space 29 is formed behind insert 20.

The material to be molded is now poured into the mold vessels and fills the same. The material, which may be a resin derivative capable of pouring, such as Catalin, flows into the space 29 as well as into the main space 35 of the mold. The filling of space 29 is not disadvantageous, wherefore the insert need not have a tight fit in the mold vessel. The fluid mass may flow under the bottom of the insert 20 into space 29, and the bottom of the insert may be made to permit this flow. Air is expelled from space 29 as the fluid flows upwardly therein, the top of the insert being formed for egress of air and to prevent air pockets.

Thus in the pouring process, the insert becomes imbedded in the fluid being cast, as is illustrated in Fig. 11. It will be seen that the insert cannot be drawn out of the mold vessel because of the character of the depression 22 whereby the insert is anchored in the mold vessel due to the material contained in the mold vessel.

After pouring, the molds with the material therein are set aside for hardening and curing which may take, for example, a week. The treating time differs, of course, with the character of material used. When the material has been cured or otherwise treated in the mold, the cast article and mold are separated. In this operation, the molded article 30, the insert 20 and the material in space 29 are ejected as a unit from the mold vessel 15. That is, the casting is removed from the mold with the insert imbedded therein. The insert with the surplus material on its back is now removed from the casting 30 and the casting is trimmed at the top and the flash removed at the contact line between the insert edges and the mold vessel. The surplus material may be salvaged for reuse and the insert is available for reuse. The material of the mold vessel may be melted down for reuse.

It will be seen that very little trimming is necessary, merely what corresponds to the edge of the insert. Also it will be noted that the seams of multiple part molds are avoided. The invention provides a cheap and accurate mold where castings must remain in molds for a time interval.

What I claim is:

1. A mold for forming a cast member having an embossing including a one-piece open-ended container adapted to receive in fluid state a material to be cast and shaped to permit withdrawal of the material through the open end on hardening, said mold being enlarged outwardly where the embossing is to be formed in the cast member on pouring, a stamped sheet metal partition insert formed to the contour of the embossing and the cast member and having its edges in contact with side walls of the container and spaced from other walls thereof when inserted so as to form a pocket for excess material.

2. A mold for making a plastic shape having an offset design surface including a one-piece container adapted to receive in fluid state a material to be cast and shaped to permit withdrawal of said material in a given direction on hardening and a thin deformed sheet metal member stamped to conform to the offset design surface and fitting into said container having edges in contact with side walls of the container and surfaces spaced from other walls thereof and removable from said container in said given direction, said member being removable with the cast material as a unit.

3. A mold for making an embossed plastic shape including a one-piece container adapted to receive in fluid state a material to be cast and shaped to permit withdrawal of said material in a given direction on hardening and a deformed sheet metal member stamped to conform to the embossing and fitting into said container having edges in contact with side walls of the container and spaced from other walls thereof and removable from the container in said given direction, which member provides space on each side thereof for reception of the material to be cast and is removable from the container with the material on each side thereof as a solid unit.

4. The method of molding an embossed shape of long-curing plastic which includes placing in a mold an insert of thin material conforming in part to the embossing and in part spaced from the interior wall of the mold on both sides, introducing material to be molded into the mold while the insert is in place so that the material flows on both sides of the insert, and withdrawing the molded material with the insert attached thereto from the mold and thereafter removing from the molded shape the insert and the plastic attached to the one face thereof.

5. The method of molding an embossed shape of long-curing plastic which includes placing in a mold an insert formed by die-stamping a thin sheet to conform to the embossing and contacting side walls of the mold and spaced from other walls thereof, introducing material to be molded into the mold vessel with the insert in place so as to substantially imbed the insert therein, and withdrawing the molded material with the insert imbedded therein from the mold vessel.

LURELLE GUILD.